Figure 1:
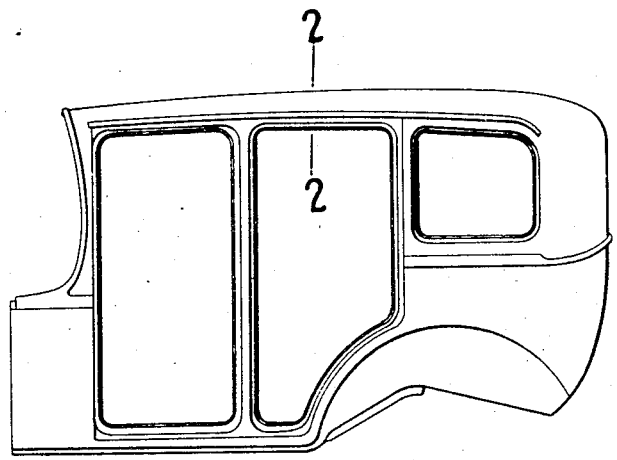

Sept. 4, 1934.  J. LEDWINKA  1,972,267

VEHICLE BODY DRIP CHANNEL CONSTRUCTION

Filed March 30, 1931

INVENTOR.
JOSEPH LEDWINKA
BY John P. Tarbox
ATTORNEY.

Patented Sept. 4, 1934

1,972,267

UNITED STATES PATENT OFFICE 1,972,267

VEHICLE BODY DRIP CHANNEL CONSTRUCTION

Joseph Ledwinka, Philadelphia, Pa., assignor to Edward G. Budd Manufacturing Company, Philadelphia, Pa., a corporation of Pennsylvania Application March 30, 1931, Serial No. 526,260

1 Claim. (Cl. 296—135)

My invention relates to a drip channel construction especially adapted for use in connection with automobile bodies constructed of sheet metal stampings.

It is a main object of the invention to provide a drip channel which may be readily joined by spot welding to a metal roof panel, and which provides a neat appearance, adds strength to the edge of the roof panel, when joined thereto, and is so formed as to avoid injury or distortion thereto in handling or shipping, or in the welding of the same to the roof panel. The roof panel to which the drip channel is secured is also formed to strengthen it and avoid distortion in regions above the place of attachment of the drip channel.

I attain these and other objects and advantages by the novel construction disclosed herein by reference to the following detailed description when read in connection with the appended drawing forming a part hereof, and claimed in the claim appended hereto.

Figure 2:
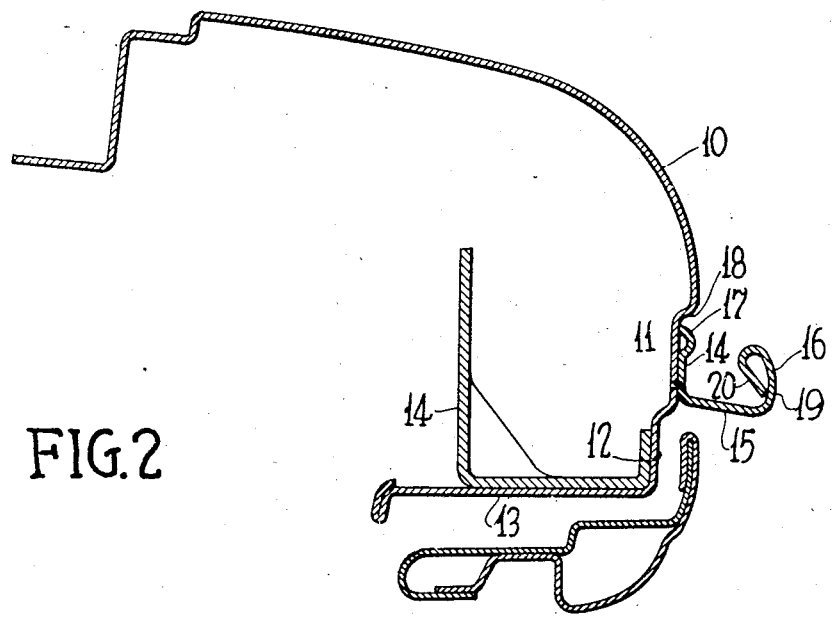

In the drawing,

Fig. 1 is a side elevation of a body to which the invention is shown applied and Fig. 2 is an enlarged sectional view through the roof side on a line taken just above a doorway opening as indicated by the line 2—2 of Fig. 1.

In the drawing, there is illustrated a sheet metal body construction in which the entire outer side panel of the body including the door and window openings is made of a single unitary sheet metal stamping. Above the door and window openings this panel forms the side quarter 10 of the roof and at the lower margin of this roof panel portion it is formed with an inwardly offset portion forming a depression 11 extending continuously longitudinally of the body over all the door and window openings in the body side. At the doorway openings the panel is further offset inwardly at 12 to form the recess to receive the door overlap indicated at 12. Above the door opening the panel is extended inwardly at 13 to the depth equal substantially to the thickness of the body wall, to form the door jamb. The roof panel may be reinforced, as shown, by an angular reinforcement as 14 seated in the angle formed by the portions 12 and 13 to which it is secured as by spot welding.

This specific construction of roof panel is, however, merely illustrative of one form of panel to which the invention may be applied, it being merely essential that the roof panel extending over the side quarter of the roof be a sheet metal panel and provided with an offset seat to receive the drip channel at the margin of the roof.

The drip channel of the invention comprises the sheet metal channel having inner side wall 14, the bottom 15, and the outer side wall 16. The inner wall projects somewhat above the outer wall and is formed with an outwardly projecting bead 17 along its upper edge having its upper wall seated against the panel. This bead serves to strengthen the margin of the channel and also improves the appearance of the joint between the drip channel and the shoulder 18 formed by the depressed seat in which the drip channel is secured. This shoulder aids in positioning the drip channel in the assembly. The drip channel is most easily secured to the metal panel by a line of spot welds connecting the inner side wall 14 below the bead 17 to the offset depressed seat 11 of the roof panel. The bead 17 and the shoulder 18 both tend to prevent distortion of the metal of the roof panel above the shoulder 18 in the spot welding of the parts. The heat of the weld without these strengthening beads and shoulders may, in some cases, cause sufficient distortion of the metal of both the visible inner wall of the channel and the roof panel above the channel to show in the highly polished surface of the body when completely painted and polished. By the provision of these beads and shoulders such difficulties are entirely obviated.

The bottom 15 of the channel is inclined downwardly and outwardly, thereby effectively preventing any water collecting on the outer side of the channel, either by overflow or otherwise, from flowing inwardly along the bottom of the channel and finally finding its way into the inside of the body. The outward inclination effectively sheds all water outwardly of the door edge, as clearly appears in Fig. 2.

The drip channel is further improved in appearance and in strength by having its outer side wall rounded to present a convex face outwardly, its margin being reversely bent into a loop 20 forming a hollow beaded edge directed inwardly of the channel. This beading of the channel along the edges, not only greatly improves the appearance of the assembly but it likewise greatly strengthens and stiffens the channel against distortion or deformation of the edges of the side walls in the handling and shipping of the same. When the channel is finally strongly and integrally secured to the margin of the roof panel by the series of spot welds, it forms an additional strong reinforcement for the edge of the roof panel, a large part of this reinforcement being due to the beaded formations at the margins of the channel.

While I have herein described a specific embodiment of my invention which I have found highly efficient and practical in use, it will be understood that the advantages attained may be attained by modifications of the specific embodiment, which fall within the spirit of the invention and the language of the appended claim.

What I claim is:

In a vehicle body, in combination, a metal roof panel having a depression formed therein adjacent the margin of the roof, and a metal drip channel having its inner side wall permanently exposed seated in said depression and rising above its outer wall, the portion rising above the outer wall of the channel being formed with an inwardly facing permanently exposed bead of a width extending through said portion of the inner wall rising above the top of the outer wall, the upper wall of said bead being seated against the panel, said inner wall being secured by spot welding it in the area below said bead to the roof panel, whereby the welds are normally hidden from view and prevented from distorting the metal of the channel and panel in the region above the top of the outer wall of the channel.

JOSEPH LEDWINKA.